United States Patent [19]

McMillen

[11] 4,296,343
[45] Oct. 20, 1981

[54] ELECTRIC MOTOR HOUSING, OR THE LIKE, WITH INTEGRAL POLE AND METHODS FOR MAKING SAME

[75] Inventor: Bobby E. McMillen, Columbus, Miss.

[73] Assignee: AMBAC Industries, Incorporated, Farmington, Conn.

[21] Appl. No.: 82,178

[22] Filed: Oct. 5, 1979

[51] Int. Cl.³ .................................... H02K 23/04
[52] U.S. Cl. .................................. 310/154; 310/42; 310/185; 310/186
[58] Field of Search .............. 310/154, 152, 42, 89, 310/184–188

[56] References Cited

U.S. PATENT DOCUMENTS

| | | | |
|---|---|---|---|
| 2,456,701 | 12/1948 | Hansen | 310/154 |
| 2,683,826 | 7/1954 | Staak | 310/154 |
| 3,083,310 | 3/1963 | Tweedy | 310/154 |
| 3,445,693 | 5/1969 | Crawshaw | 310/42 |
| 3,510,707 | 5/1970 | Stone | 310/154 |
| 3,889,141 | 6/1975 | Merriam | 310/154 |
| 3,988,623 | 10/1976 | Yamaguchi | 310/154 |
| 4,151,435 | 4/1979 | Jandeska | 310/154 |

*Primary Examiner*—R. Skudy
*Attorney, Agent, or Firm*—John C. Dorfman

[57] ABSTRACT

An electrical machine including an armature rotatable within a housing comprised of a section of tubular ferrous material and methods for producing the housing. At least two alternate magnetic field pole pieces are secured within the housing and at least two intermediate induced pole pieces are formed by deforming the housing to provide inwardly projecting pole pieces intermediate the magnetic field pole pieces, each of the pole pieces conforming to the shape of and closely embracing the armature.

6 Claims, 11 Drawing Figures

ELECTRIC MOTOR HOUSING, OR THE LIKE, WITH INTEGRAL POLE AND METHODS FOR MAKING SAME

BACKGROUND OF THE INVENTION

This invention relates generally to electrical motors, and like devices, and, more particularly, to a housing for an electrical motor, or the like, with an integral pole structure and methods of forming such a housing.

DESCRIPTION OF THE PRIOR ART

In the past, AMBAC Industries, Incorporated, has made a considerably number of motors using predetermined lengths of tubular metal stock for housings. These housing have not been fabricated but housings have been provided with fields using either permanent magnet pole pieces or pole pieces with electro-magnetic windings secured in some way to the internal surface of the tubular section. Brushes for d.c. motors have been mounted on one of two end caps which close the tubular housing and provide shaft supporting bearings. Such motor housings substantially reduce production cost without a substantial loss of quality in the performing characteristics of the motor.

One area of continuing substantial cost in such motors is the cost of their field pole pieces. Each pole piece is either a relatively expensive permanent magnet or a wound piece involving time and expense. The present invention recognizes the possibility of eliminating half of the pole pieces by inducing poles of proper polarity in pole pieces formed in the magnetic material of the tubular housing, using the magnetic flux paths in an electric motor or similar electro-magnetic device to induce the poles. Using a tubular magnetic housing of sufficient gauge and magnetic permeance, the flux path may be confined primarily to the housing. Then, if the housing, itself, is fabricated in such a way as to form the pole pieces at locations intermediate magnetic pole pieces formed either by permanent magnets of by field windings on magnetic cores and at the proper pole position within the housing relative to the armature, poles of opposite polarity from the permanent magnet or wound pole pieces will be induced and function in the same way, but with a substantial reduction in cost.

SUMMARY OF THE INVENTION

The present invention comprises a housing for an electrical motor, or the like, having a fixed field, at least one pole of which is formed an integral part of a generally tubular magnetic housing. The housing comprises a section of tubular ferrous material having at least one magnetic field pole piece secured therein, including means to generate a magnetic field and at least one other field pole piece wherein the polarity is induced by the presence of a magnetic field including said other field pole piece. The field pole pieces of both types generally conform to the shape of the armature and are positioned to provide alternate poles for the machine. In a four pole motor, at least two intermediate induced field pole pieces located between and spaced from alternative magnetic field pole pieces are formed by deforming the sidewalls of the tubular ferrous material to provide inwardly projecting pole pieces of proper shape to intermediate the magnetic field pole pieces. The inwardly projecting regions generally conform to the shape of and are spaced close to the armature in order to include the armature in the magnetic circuit. Alternate intermediate poles are induced by the magnetic flux paths which pass through the intermediate pole pieces from the magnetic field pole pieces and the armature in the total magnetic flux path.

The invention also comprises several alternative methods of forming the housing for the electrical machine, including the induced pole pieces.

BRIEF DESCRIPTION OF THE DRAWINGS

The foregoing summary as well as the following detailed description of a preferred embodiment of the present invention will be better undertsood when read in conjunction with the appended drawings in which.

DESCRIPTION OF A PREFERRED EMBODIMENT

Figure 1:
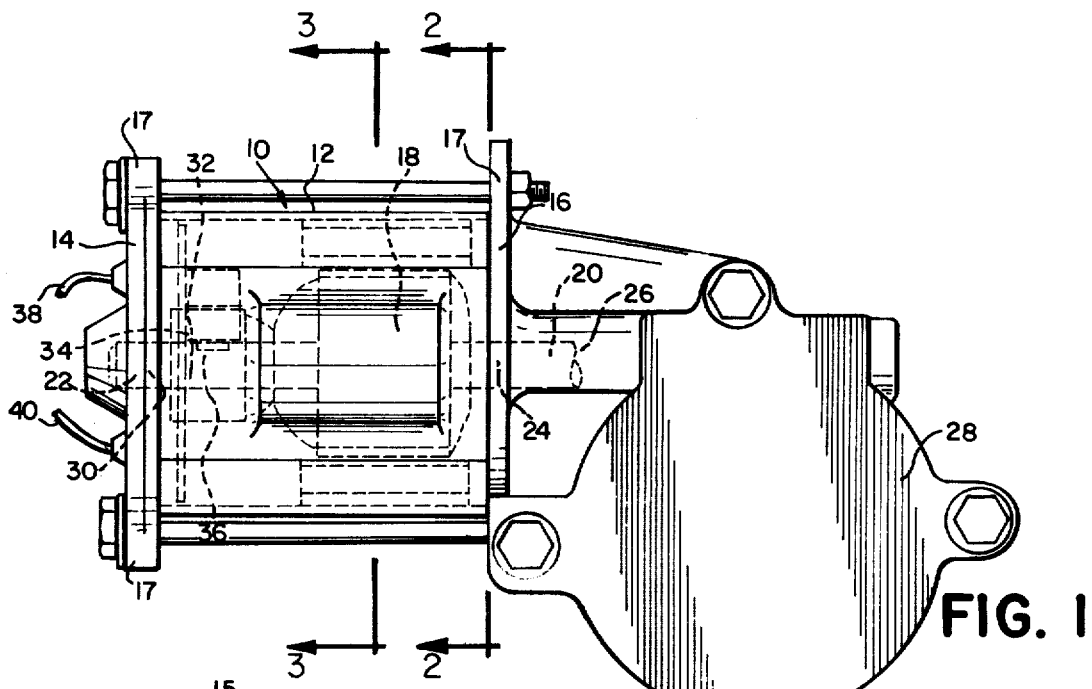
FIG. 1 is a plan view of a four pole electric motor constructed in accordance with the present invention with an associate mechanism.
Figure 4:
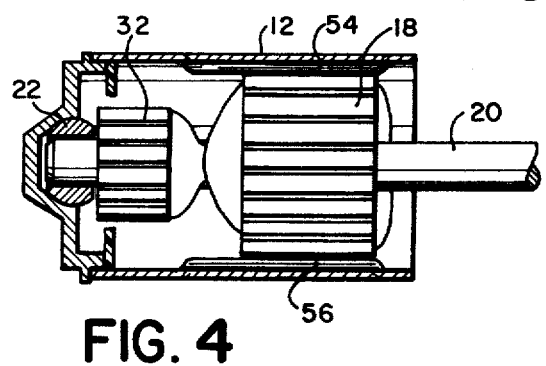
FIG. 4 is a longitudinal cross-sectional view of the housing of the motor of FIG. 1 showing the armature therein in elevation.

Referring to the drawings, and particularly to FIGS. 1 and 4, there is depicted, in accordance with the present invention, an electric motor, shown generally as 10. Although this embodiment discusses the present invention as applied to an electric motor, and specifically a four pole motor, it is equally applicable with an electric generator or any other electrical apparatus having a magnetic pole, an induced pole and an armature wherein a housing of magnetic material is fabricated to form the induced pole.

The motor 10 comprises a generally tubular ferrous housing 12 whose ends are suitably closed by end caps 14 and 16. The end caps 14 and 16 may be held in place by nuts and bolts as shown or other suitable means which, for example, extend through retainer openings 15 in lugs 17. The motor 10 includes an armature 18 (shown in phantom on FIG. 1), constructed of conductors wound on to a laminated core in a manner which is well known in the art. The armature core is supported by an armature shaft 20 which is journalled for rotation within suitable bearings 22 and 24 located in the end caps 14 and 16, respectively. A first end 26 of the armature shaft 20 extends outwardly from the end cap 16 and may include a gear, for example, a worm (not shown), fixed for rotation therewith. A transmission means or the like, shown generally as 28, may include gear means engaging the worm of the armature shaft for transmitting the rotational torque of the motor 10 into a form suitable for a specification application. For example, the transmission means 28 may include a large gear whose output shaft is adapted to raise or lower an automobile window.

The other end 30 of the armature shaft 20 includes a commutator 32 (as seen in FIG. 4), constructed in a manner well known in the art, which is fixedly attached for rotation with the armature shaft 20. The commutator 32 is connected to the appropriate windings of the armature 18 in a connectional manner. A pair of brushes 34 and 36 (shown in phantom on FIG. 1) are slidably mounted within suitable brush holders (not shown) on the interior of end cap 14. The brushes 34 and 36 are each urged by a spring under tension (not shown) within the respective brush holders to engage the successive segments of the commutator 32 in the usual manner. Suitable conductors 38 and 40 are connected to the brushes 34 and 36 and extend outwardly from the end cap 14 for the purpose of providing electrical power to the motor 10.

The foregoing is a description of the various components of a typical motor which is well known in the art. As such, this description is not intended to be limiting upon the present invention which will hereinafter be described in detail.

Figure 2:
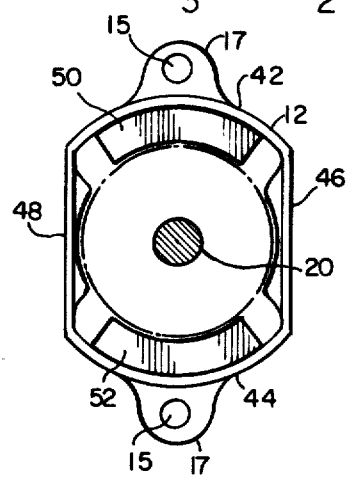
FIG. 2 is an axial cross-sectional view of the motor of FIG. 1 taken along lines 2—2.
Figure 3:
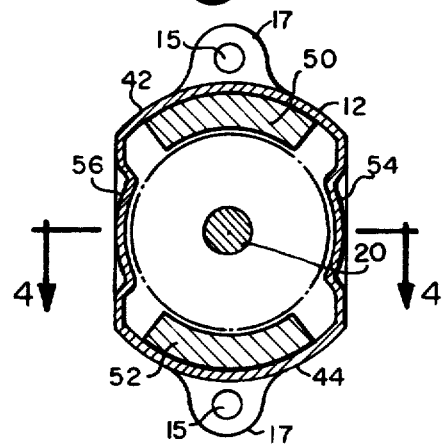
FIG. 3 is an axial cross-sectional view of the motor of FIG. 1 taken along lines 3—3.
Figure 5:
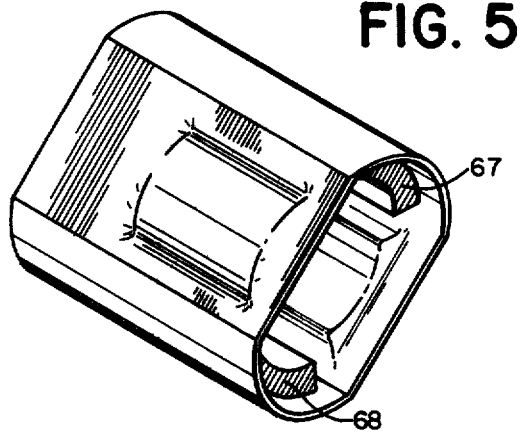
FIG. 5 is a perspective view of the housing of the motor of FIG. 1.

Referring now to FIGS. 2, 3 and 5, there is depicted, in greater detail, the generally tubular ferrous motor housing 12. The housing 12 includes a pair of generally curved portions 42 and 44 (at the top and bottom as seen in FIG. 2) and a pair of generally parallel flat sidewalls 46 and 48, preferably fabricated by flattening opposed sidewalls of a section of tubing, such as round tubing. The housing 12 could also be constructed from a flat sheet of ferrous material. A pair of magnetic field pole pieces or permanent magnets 50 and 52 are secured within the interior of the curved housing portions 42 and 44, respectively. The radially exterior surface of each of the generally curved magnets 50 and 52 is curved to generally conform to the shape of the interior of the generally curved housing portions 42 and 44. The radially interior surface of each of the generally curved magnets 50 and 52 is appropriately curved to generally conform to the shape of the radially exterior surface of the armature 18. As shown in FIG. 1, the magnets 50 and 52 are axially positioned within the housing 12 so that they are opposite the armature 18. The magnets 50 and 52 in the present embodiment are preferably ceramic magnets and are secured to the interior of the housing 12 by means of an epoxy-type glue. The specific use of permanent magnets and the specific method of attaching the magnets to the housing are not intended to be limitations on the present invention. Other suitable types of pole pieces, including electro-magnetic pole pieces, and any suitable method of attachment could be employed with preferred results.

Again, viewing FIGS. 3 and 5, it can be seen that each of the housing sidewalls 46 and 48 has been deformed by being pressed inwardly to form inwardly projecting pole pieces 54 and 56. The interior surfaces of the inwardly projecting pole pieces 54 and 56 are suitably curved to closely conform to the radially exterior surface of the armature 18 in order to minimize the air gaps between the pole pieces 54 and 56 and the armature 18. The inwardly projecting pole pieces 54 and 56 are located axially along the length of the housing sidewalls 46 and 48 so as to be opposite the armature 18. As is best seen in FIG. 3, the shape of the radially interior surfaces of inwardly projecting pole pieces 54 and 56 closely conform to the shape of the radially interior surfaces of magnets 50 and 52.

The purpose of the inwardly projecting pole pieces 54 and 56 is to serve as intermediate induced field poles for the motor 10. The intermediate poles pieces 54 and 56 are magnetized by the induction effects generated from the magnets 50 and 52 in cooperation with the flux path of the armature 18 in the total magnetic flux path.

In operation, current is supplied over conductors 38 and 40 to brushes 34 and 36. The brushes, in turn, supply current through the commutator 32 to the windings of the armature 18. The flow of the current through the armature windings results in the generation of magnetic fields which act with the magnetic fields of the pole pieces 50 and 52 to produce motor action driving the armature. The intermediate field pole pieces 54 and 56 are in the flux circuit, thereby causing poles of opposite polarity from the others to be induced causing the armature shaft 20 to rotate.

FIGS. 6a and 6b, 7a and 7b and 8a and 8b schematically depict three different methods of forming the motor housing 12.

Figure 6A:
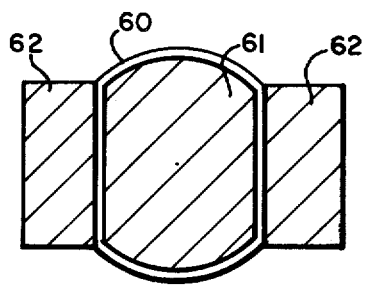
FIGS. 6a and 6b are schematic illustrations of steps of producing the housing of FIG. 5 in accordance with a first method.
Figure 6B:
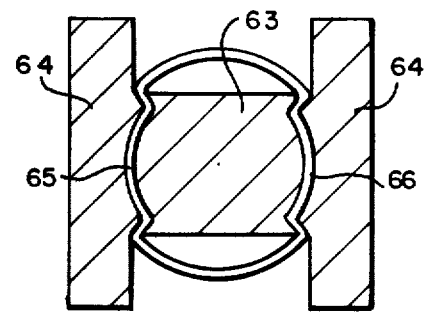

The first method (shown in FIGS. 6a and 6b) involves selecting a section of tubular ferrous stock 60 of a suitable length and of sufficient thickness to provide mechanical stability when deformed. Using suitable opposed dies 62 and a suitably shaped mandrel 61, the sidewalls are first flattened as shown in FIG. 6a. Next, portions of the flattened sidewalls are further deformed as shown in FIG. 6b utilizing appropriately shaped dies 64 opposed to a suitably shaped mandrel 63 to form the inwardly projecting pole pieces 65 and 66. Finally, the magnetic field pole pieces 67 and 68 are secured in alternate positions within the curved portions of the housing as shown in FIG. 5, between and spaced from the inwardly projecting pole pieces 65 and 66. The inwardly projecting pole pieces 65 and 66 generally conform to and are close spaced to the radial 14 exterior surface of the armature to minimize the air gap therebetween and are of the size and shape required in the overall magnetic circuit for desired magnetic effects to generate induced intermediate poles.

Figure 7A:
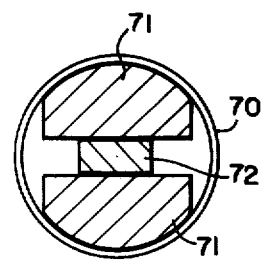
FIGS. 7a and 7b are schematic illustrations of the steps of producing the housing of FIG. 5 in accordance with an alternate method.
Figure 7B:
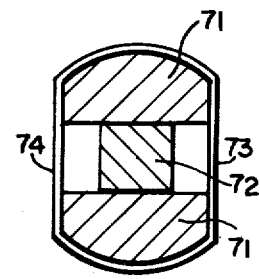

The second method involves selecting a suitable section of tubular ferrous stock 70 (shown in 7a) as in the first method. Next, a pair of suitably shaped dies 71 are placed within the tube with a suitably expansible member 72 therebetween. The expansible member 72 is expanded, thereby stretching the tube 70 to form flat sidewalls 73 and 74 as shown in FIG. 7b. Next, portions of the flattened sidewalls 73 and 74 are further deformed as described above and as depicted in FIG. 6b. Finally, the magnetic field pole pieces 67 and 68 in FIG. 5 are secured in place as described above.

Figure 8A:
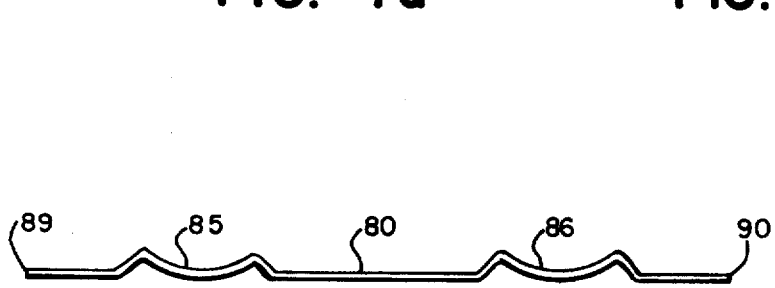
FIGS. 8a and 8b are schematic illustrations of the steps of producing the housing of FIG. 5 in accordance with an alternate method.
Figure 8B:
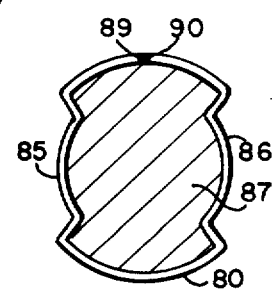

The third method involves first selecting a strip of flat ferrous sheet stock 80 of an appropriate size and of sufficient thickness. The flat sheet 80 is then stamped or rolled, or otherwise formed at appropriate locations to form the inwardly projecting regions 85 and 86 as shown in FIG. 8a. Next, the flat stock is suitably rolled, preferably around a mandrel 87, and its opposite ends 89 and 90 are welded, or otherwise fastened together as shown in FIG. 8b. Finally, the magnetic field pole pieces 67 and 68 in FIG. 5 are secured in place as described above.

From the foregoing description it can be seen that the present invention comprises an electrical machine having a housing which has been deformed to provide inwardly projecting pole pieces which cooperate with magnetic field pole pieces and the armature to provide intermediate induced field poles for the machine. The invention also comprises several methods of producing such a housing. It will be recognized by those skilled in the art that changes may be made to the above-described apparatus and methods without departing from the broad inventive concepts thereof. For example, the housing may be constructed from a generally square tubular ferrous material or some other type of magnetic field pole pieces may be employed. It is understood, therefore, that the invention is not limited to the embodiment disclosed, but is intended to cover all modifications which are within the spirit and scope of the appended claims. It will also be understood that other magnetic devices capable of construction using a tubular metal housing may be formed with a pole piece suitable for an induced pole and properly located whereby the magnetic flux path induces are magnetic poles in the pole pieces.

I claim:

1. An electric machine including an armature supported on a shaft for rotation within a housing, the housing comprising:

a section of tubular ferrous material;

at least two magnetic field pole pieces secured within the tubular ferrous material to provide alternate poles having curved surface areas spaced from and conforming generally to the curvature of the armature, and;

at least two intermediate induced field pole pieces provided by inwardly projecting sections of side walls of the tubular ferrous material and having arcuate face surfaces essentially equal in area to that of the magnetic pole pieces and spaced from the magnetic field pole pieces, said inwardly projecting pole pieces providing alternate intermediate poles for the machine by the induction effects generated from the magnetic field pole pieces in cooperation with the armature in the total magnetic flux path.

2. The machine as recited in claim 1 wherein the magnetic field pole pieces comprise permanent magnets.

3. The machine as recited in claim 2 wherein the permanent magnets are ceramic magnets having a first surface curved to conform to the curved interior of the tubular housing and a second surface opposite the first surface which is curved to conform to the shape of the armature.

4. The machine as recited in claim 3 wherein the ceramic magnets are secured within the tubular housing by means of an epoxy glue.

5. The machine as recited in claim 4 wherein there are two alternate magnetic field pole pieces and two intermediate field pole pieces in which the magnetic effects are induced.

6. The machine as recited in claim 1 wherein the section of the tubular ferrous material has flat surfaces parallel to one another and from which an extended portion of the said flat surface projects inwardly to provide the intermediate poles.

* * * * *